United States Patent [19]
Madison

[11] Patent Number: 5,186,109
[45] Date of Patent: Feb. 16, 1993

[54] SIDE SHIFT RAILWAY GUIDE WHEEL APPARATUS FOR RAIL/HIGHWAY CONVERSION WITH V-SHAPED AUTOMATIC CENTERING SURFACES FOR CENTERING VEHICLE RELATIVE TO THE RAILS

[75] Inventor: Harry Madison, Germantown, Tenn.

[73] Assignee: Harsco Corporation, Wormleysburg, Pa.

[21] Appl. No.: 777,142

[22] Filed: Oct. 16, 1991

[51] Int. Cl.⁵ ............................................. B61F 5/00
[52] U.S. Cl. .................................. 105/215.2; 105/72.2
[58] Field of Search ...................... 105/26.1, 72.2, 171, 105/199.5, 215.1, 215.2

[56] References Cited

U.S. PATENT DOCUMENTS

| | | | |
|---|---|---|---|
| 3,338,184 | 8/1967 | Fischer | 105/215.2 |
| 3,701,323 | 10/1972 | Cox | 105/72.2 |
| 3,704,671 | 12/1972 | Horne, Jr. et al. | 105/215.2 |
| 3,762,337 | 10/1973 | McKeon et al. | 105/215.2 X |
| 3,763,784 | 10/1973 | Olson, Sr. et al. | 105/72.2 |
| 4,488,494 | 12/1984 | Powell, Sr. | 105/215.2 |
| 4,583,465 | 4/1986 | Powell, Sr. | 105/215.2 |
| 4,708,066 | 11/1987 | Heckman | 105/215.2 |
| 5,016,544 | 5/1991 | Woollam | 105/215.2 |
| 5,090,332 | 2/1992 | Edwards et al. | 105/157.2 |

Primary Examiner—Robert J. Oberleitner
Assistant Examiner—S. Joseph Morano
Attorney, Agent, or Firm—Kerkan, Stowell, Kondracki & Clarke

[57] ABSTRACT

A railway guide wheel apparatus attaches to a frame of a road vehicle to allow the road vehicle to travel along rails. The apparatus has a side shift capability where railway wheels of the apparatus may be lowered to engage rails even when the vehicle is offset sideways from the rails. An automatic centering arrangement will center the vehicle relative to the rails after the railway wheels have engaged the rails. Spring cells are used as a suspension to absorb vibration from the railway wheels contacting the rails and to maintain the railway wheels in contact with the rails.

19 Claims, 6 Drawing Sheets

FIG_1

SIDE SHIFT RAILWAY GUIDE WHEEL APPARATUS FOR RAIL/HIGHWAY CONVERSION WITH V-SHAPED AUTOMATIC CENTERING SURFACES FOR CENTERING VEHICLE RELATIVE TO THE RAILS

BACKGROUND OF THE INVENTION

This invention relates to a rail engagement apparatus for a road vehicle. More specifically, this invention relates to a rail engagement apparatus mountable upon a road vehicle and having railway wheels which may engage the rails even when the vehicle is not centered over the track.

Railroad service crews often have to go to various places along a railroad track in order to make repairs and inspections. Depending upon the type of service which is to be performed and other factors, the service crew may ride to the work site using a rail vehicle or using a road vehicle, such as a truck or car. Since the best way to a work site may include travel along a road and travel along a railway, service crews and other rail workers often have used road vehicles having a rail engagement or guide wheel apparatus mounted on them. Such cars or trucks may travel along a highway or other road with road wheels engaging the road. Upon getting to an appropriate place along the railway, the rail engagement apparatus is operated such that railway wheels are lowered from the vehicle until the vehicle is bound to the railway. Usually such vehicles include an apparatus at the front of the vehicle which lifts the front road wheels off the ground when two front railway wheels engage rails and an apparatus at the back of the vehicle, which apparatus secures the back of the vehicle to the rails by two back railway wheels. The two back railway wheels usually allow the regular road wheels to contact the rails or other surface such that the road wheels may provide traction to move the vehicle even when the two front railway wheels and two back railway wheels have secured the vehicle to the rail. When the vehicle wishes to leave the railway, the two front railway wheels and the two rear railway wheels are retracted or lifted up such that the vehicle may again run along the road.

Various structures have been used to allow railway wheels to be attached to road vehicles. Although such structures have been generally useful at moving the railway wheels between an upper position in which the vehicle may travel along a highway or other road and a lower position in which the vehicle travels along a railway, such structures have often been subject to one or more of several disadvantages.

When the driver of a vehicle wants to lower the rail wheels for engagement with the rails, the driver must stop the vehicle such that it is centered over the rails. It is often difficult to get the rear of the vehicle centered over the rails. The driver may have to try more than once in order to get the rear of the vehicle centered over the rails such that lowering of part of the apparatus will cause the rear rail wheels to engage the rails.

A further problem some railway guide wheel devices designed for the rear of a vehicle is that they may not include any type of suspension. Since at least some of the rear wheels of the vehicle are supporting a portion of the vehicle weight, such designs do not include any provision for dampening vibration from the railway wheels. In addition to decreasing the comfort of anyone in the vehicle, such arrangements without a suspension for the rear railway wheels occasionally result in the rear railway wheels disengaging from the rails.

A further problem with many railway guide wheel devices is that they often have very limited ground clearance. In other words, when such devices are disposed in a road mode with the railway wheels in an upper position, the railway wheels and other parts of the mechanism may remain closer to the ground than is desirable. Since such vehicles may often have to be driven upon dirt roads or other irregular surfaces, such limited ground clearance is a significant disadvantage in many such designs.

U.S. Pat. No. 4,583,465 issued Apr. 22, 1986 to Powell shows a railway guide wheel apparatus for the rear of a vehicle. That apparatus does have the ability to side shift a wheel support axle such that the vehicle does not need to be precisely aligned with the railway tracts in order for the railway wheels to engage the rails. Two pairs of toggle structures are used in combination with two hydraulic cylinders in order to provide for the side shifting of the wheel axle. However, the same hydraulic cylinders which are used to provide the side shift are also used to lower the wheels such that shifting the wheel support axle sideways may require one to lower one end of the axle below the other end of the axle. In addition to requiring careful coordination of the control of both hydraulic cylinders in order to get the rail wheels into engagement with the rails, centering of the vehicle relative to the wheel support axle requires further activation of the two hydraulic cylinders.

OBJECTS AND SUMMARY OF THE INVENTION

Accordingly, it is a primary object of the present invention to provide a new and improved railway guide wheel apparatus for a road vehicle.

A more specific object of the present invention is to provide a railway guide wheel apparatus which provides an easy to operate side shift capability.

A further object of the present invention is to provide a railway guide wheel apparatus including a suspension arrangement.

Yet another object of the present invention is to provide a railway guide wheel apparatus which has relatively good ground clearance.

Another object of the present invention is to provide a railway guide wheel apparatus which can accommodate bumps and vibrations without the railway wheels coming off the rails.

Yet another object of the present invention is to provide a railway guide wheel apparatus which will automatically center the vehicle relative to the wheel support axle after the wheel support axle has engaged the rails.

The above and other objects of the present invention which will become more apparent as the description proceeds are realized by a railway guide wheel apparatus for a road vehicle having a mount frame adapted to be mounted to the road vehicle and a wheel support having first and second railway wheels mounted at opposite ends thereof. The wheel support is supported by the mount frame to allow relative movement therebetween. A mode actuator supported by the mount frame is operable to move the wheel support between a lower position in which the first and second railway wheels may engage rails and an upper position wherein the first and second railway wheels are sufficiently raised for allowing the road vehicle to travel on a road. A side shifter is connected to the wheel support for shifting the wheel support sideways such that the first and second wheels are lined up with the rails. (As used herein, "sideways" shall mean the direction perpendicular to the lengthwise direction of the vehicle, the sideways direction being horizontal when the vehicle itself is in its normal position upon a horizontal surface.)

Significantly, a centering means is provided for automatically centering the vehicle relative to the wheel support by moving the mount frame sideways relative to the wheel support. (As used herein, "automatic centering" shall mean that the centering is accomplished without the necessity for a human operator to further activate the side shifter after the railway wheels are lined up with corresponding rails and without the operator having to take different actions depending upon the direction in which the mount frame is offset from the center of the wheel support. In other words, once the operator has operated the side shifter to bring the railway wheels into alignment with corresponding rails, the further steps taken by him are independent of the direction and amount of offset between the mount frame and the center of the wheel support.)

The wheel support includes a first base portion and the centering means includes a first base surface on the first base portion. The centering means further includes a first mating surface supported by the mount frame. The first base surface and the first mating surface are inclined and operable for sliding engagement to move the mount frame sideways relative to the wheel support as the mode actuator increases a portion of vehicle weight applied to the first and second railway wheels.

A carriage is movably mounted to the mount frame and the wheel support is supported by the mount frame by way of the carriage. The mode actuator moves the wheel support between its lower and upper positions by moving the carriage between corresponding lower and upper positions. The wheel support is mounted for vertical movement relative to the carriage. The centering means is operable for automatically centering as the carriage moves down relative to the wheel support. The first mating surface is on the carriage.

The side shifter is a shift actuator attached to the carriage and to the wheel support to cause relative movement therebetween. The shift actuator is operable in a float mode when the centering means is automatically centering.

The wheel support may further include a second base portion and the centering means includes a second base surface on the second base portion and a second mating surface on the carriage. The second base surface and second mating surface are inclined and operable for sliding engagement to move the mount frame sideways relative to the wheel support. The second base surface is inclined in a direction opposite to the incline of the first base surface. The first and second base surfaces may be disposed adjacent to each other. Alternately, the first and second base surfaces are disposed adjacent opposite ends of the wheel support. The centering means may further include an inclined third base surface on the first based portion, an inclined fourth base surface on the second base portion, an inclined third mating surface on the carriage, and an inclined fourth mating surface on the carriage. The third base surface and fourth base surface are operable for slidably engaging the third mating surface and fourth mating surface respectively to move the mount frame sideways relative to the wheel support.

A cylindrical member is mounted to the mount frame and the mode actuator is connected to rotate the cylindrical member which in turn moves the wheel support. The wheel support is an axle and the side shifter shifts it sideways while maintaining it horizontal. The mount frame is adapted to mount adjacent the rear of a vehicle. The side shifter is a single actuator operable to move the wheel support and first and second railway wheels sideways without necessarily moving them vertically.

The present invention may alternately be described as including a mount frame, wheel support, mode actuator, and side shifter as described above combined with a suspension means for dampening vibrations between the first and second railway wheels and the mount frame. The wheel support is supported by the mount frame by way of the suspension means. The suspension means may comprise two shock absorbers connected to opposite ends of the wheel support and connected to the mount frame. Each of the two shock absorbers may be attached at opposite ends of the cylindrical member for rotation therewith. Each of the shock absorbers is a spring cell.

BRIEF DESCRIPTION OF THE DRAWINGS

The above and other features of the present invention will be more readily understood when the following detailed description is considered in conjunction with the accompanying drawings wherein like characters represent like parts throughout the several views and in which:

FIG. 3 shows a side view of the apparatus in the same position as with FIG. 2;

DETAILED DESCRIPTION

Figure 1:
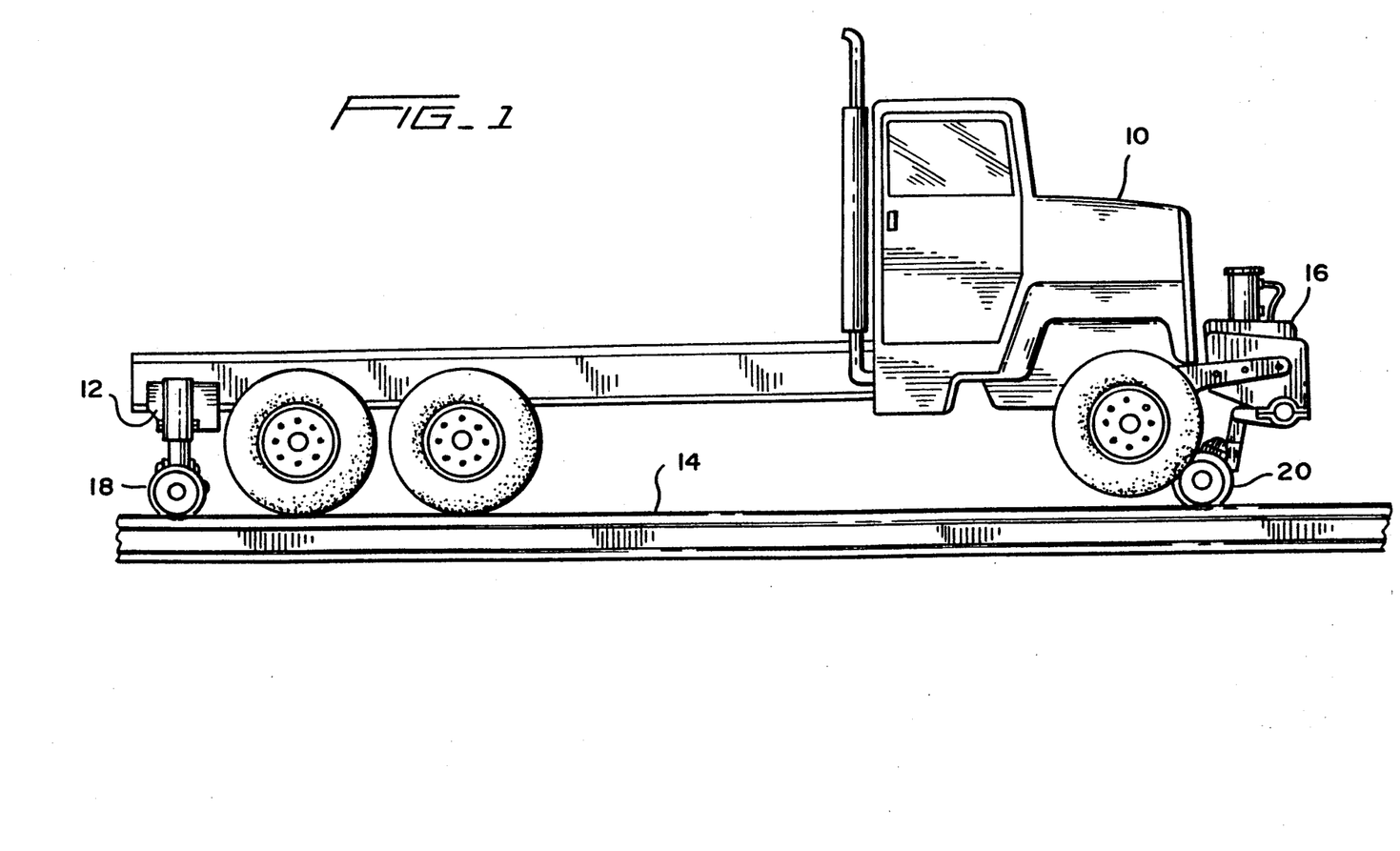
FIG. 1 shows the present invention mounted to the rear of a truck.

As shown in FIG. 1, a truck 10 has the present invention 12 mounted at its rear to allow it to move along rails 14. Additionally, mounted at the front of vehicle 10 is a railway guide wheel apparatus 16. Although that apparatus may be of various designs, it preferably will be of the type disclosed in the present inventor's U.S. Pat. application Ser. No. 07/755,115now U.S. Pat. No. 5,154,124 filed Sep. 5, 1991, entitled "Rail Engagement Apparatus Which Uses Vehicle Suspension", assigned to the assignee of the present application, and hereby incorporated by reference. As shown in FIG. 1, the present invention 12 together with the apparatus 16 allows the vehicle 10 to move along rail 14 with the front wheels of the vehicle elevated and with the rear wheels of the vehicle (or at least some of them) contacting the rails to provide traction. When one wishes to have the vehicle 10 leave the rails, the present invention 12 and the apparatus 16 are adjusted such that their railway wheels 18 and 20 are retracted or lifted. The vehicle may then be driven on the road.

Figure 2:
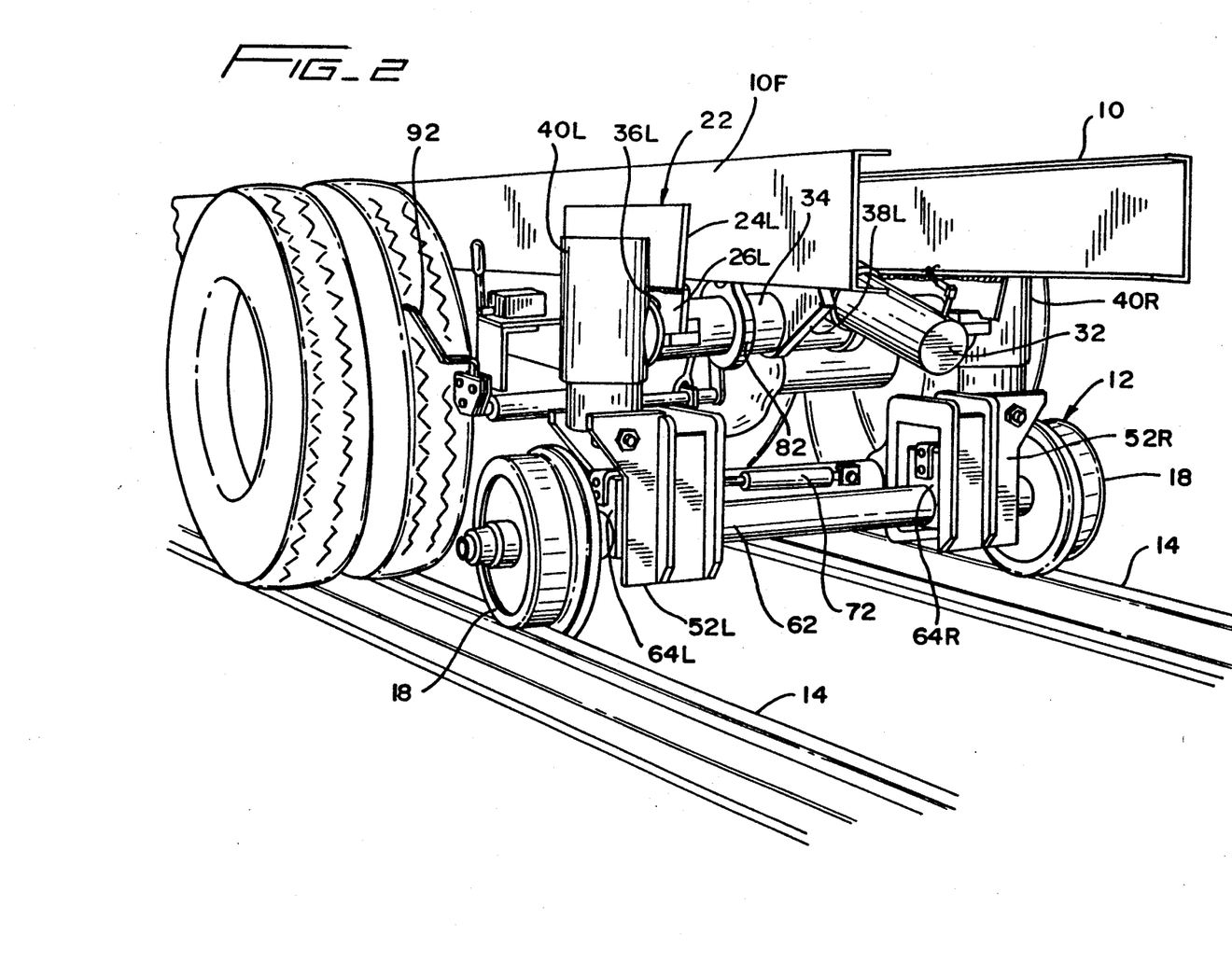
FIG. 2 is a prospective view of the present invention attached to a vehicle and with the apparatus having railway wheels in a lower position engaged to rails.

Turning now to FIGS. 2 and 3, the railway wheels 18 are disposed in a lower position such that they may engage the rails 14. A mount frame 22 is used to mount the apparatus 12 to the vehicle frame 10F. Specifically, the mount frame 22 includes a mounting plate 24L (FIG. 2 only, not shown in FIG. 3 for ease of illustration). A corresponding right side mount plate is not shown, but since much of the apparatus 12 is symmetric about an axis running centrally lengthwise down the vehicle, it will be understood that parts designated with a number having an L or an R have corresponding parts on the other side of the apparatus. The mount plate 24L and the corresponding right side plate would be welded, bolted, or otherwise attached to the vehicle frame 10F. As best shown in FIG. 3, a plate 26L extends toward the front of the vehicle. The plate 26L (and a corresponding as shown right side plate) would be welded to the plate 24L and thus fixed relative to the vehicle frame 10F. Extending between plate 26L and a corresponding right plate is a tubular brace 28 fixed to each of the plates at its opposite ends.

Figures 6, 7, 8:
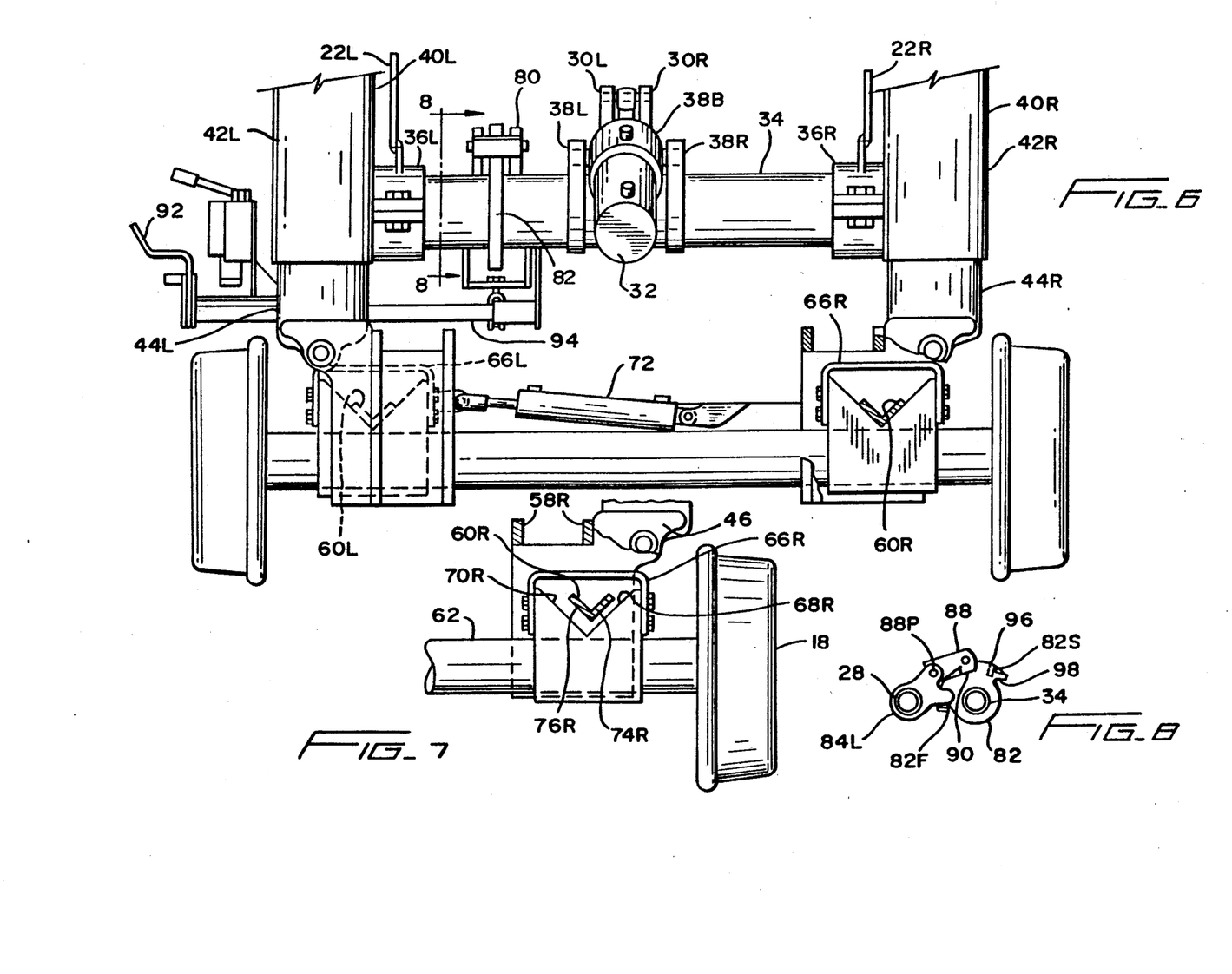
FIG. 6 shows a front view (i.e., looking towards the rear of the vehicle on which the apparatus is mounted) of the present invention.
FIG. 7 shows a front view of some of the parts also shown in FIG. 6, but with the parts in a different position.
FIG. 8 shows a cross-section view taken along lines 8—8 of FIG. 6.
Figure 9:
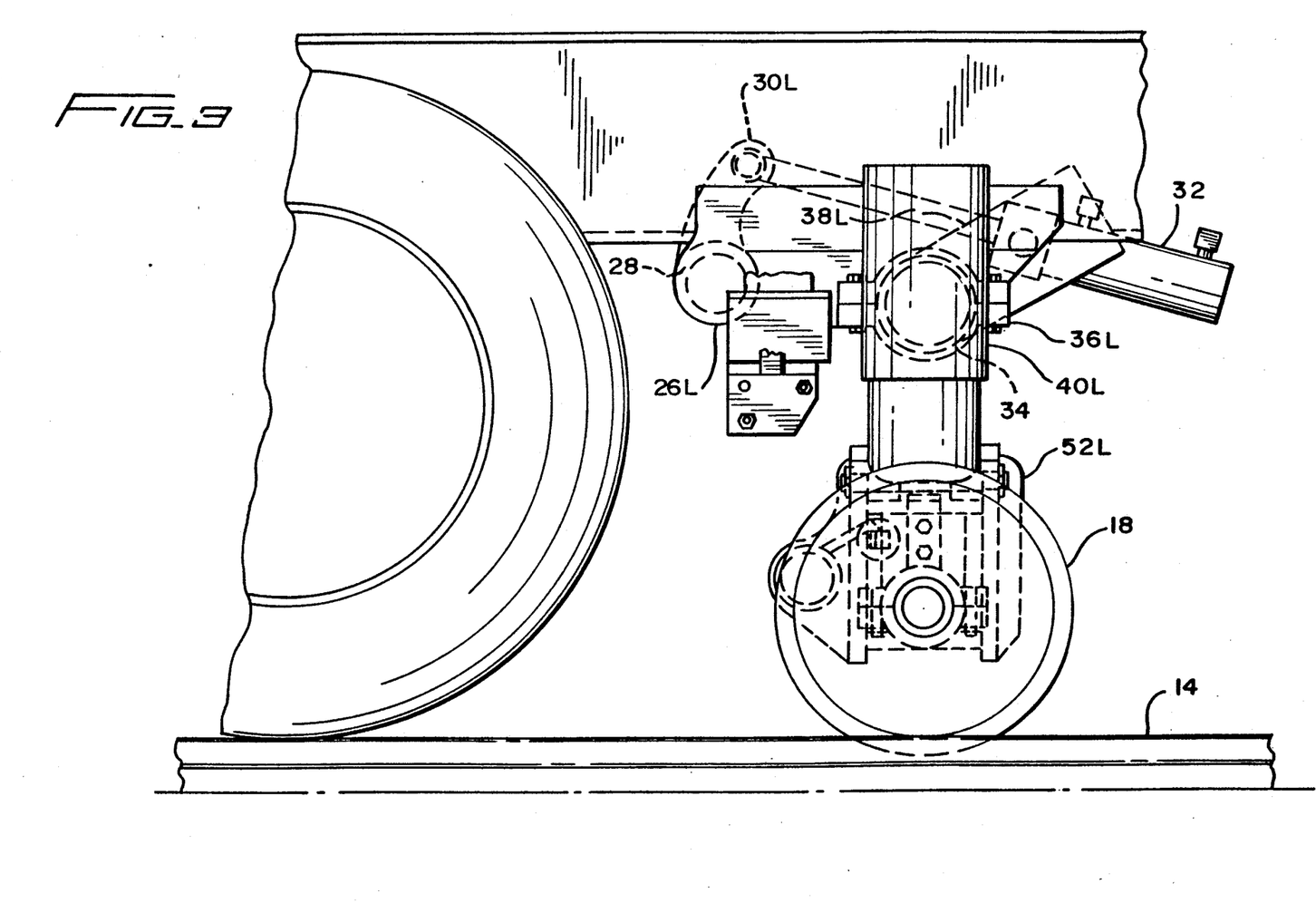

Referring briefly to FIG. 6 in conjunction with FIG. 3, plates 30L and 30R are fixed to the brace 28. The plates 30L and 30R are thus fixed relative to the vehicle frame 10F. A double acting hydraulic cylinder 32 has its rod end pivotably connected to and between the plates 30L and 30R.

Considering FIGS. 2, 3, and 6 in conjunction, a cylindrical member 34 is rotatably mounted to the mount frame by way of bearings 36L and 36R. (For ease of illustration plate 24L and the corresponding right side plate are not shown in FIG. 6, but it is noted that the bearings 36L and 36R would be secured to those plates.)

As best shown in FIG. 6, cylinder 32 is pivotably mounted to and between plates 38L and 38R by way of a band 38B which extends around the cylinder. Mounted to opposite ends of the cylindrical member 34 are spring cells 40L and 40R. The spring cells 40L and 40R serve as shock absorbers and preferably have three concentric springs therein and various adjustment features. As such spring cells have been used for railway guide wheel devices (more specifically for devices without side shift capability) for several years, the details of the devices need not be discussed. Simply and with reference to spring cell 40R of FIG. 6, each spring cell includes a casing 42R and an inner cylinder 44R movable relative to the casing with the unshown springs within the casing flexing and extending such that vibrations may be absorbed and such that the wheels 18 maintain contact with rails 14.

Figure 5:
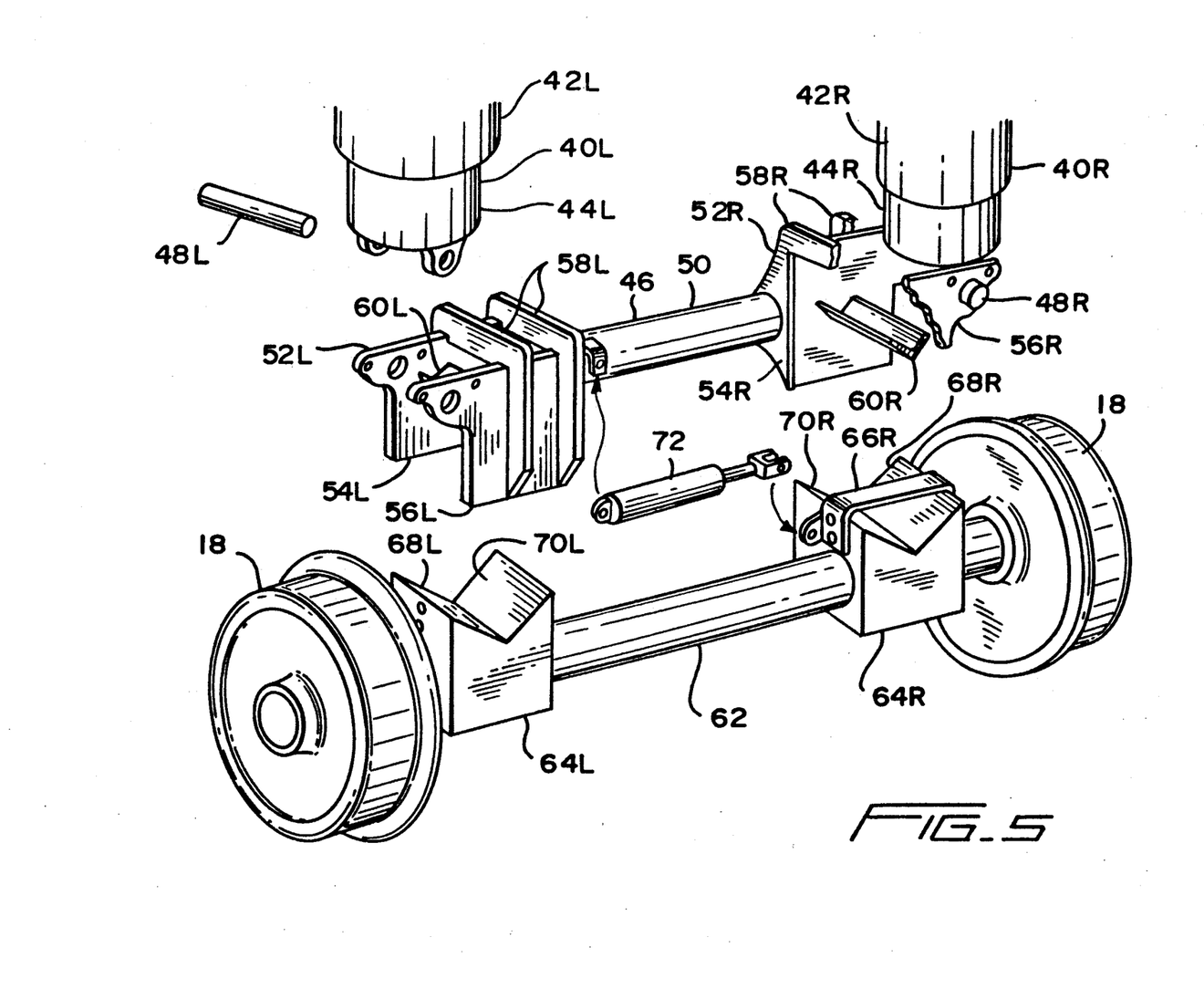
FIG. 5 shows an exploded prospective view of some parts of the present invention.

Continuing to view FIG. 6, but also considering FIG. 2 and especially FIG. 5, a carriage 46 is pinned to the lower end of cylinders 44L and 44R by pins 48L and 48R. The carriage includes a tubular member 50 extending between left and right housings 52L and 52R. The housing 52R has a back 54R mounted to the member 50 and a front 56R secured to the back by two braces 58R, pin 48R, and a V member 60R which is welded or otherwise secured to opposing faces in the front 56R and back 54R.

The rail wheels 18 are rotatably mounted to opposite ends of a wheel support 62, which is preferably a dead axle. The wheel support 62 further includes left and right base portions 64L and 64R. Mounted at each of the base portions 64L and 64R is a metallic retaining strap 66R and 66L (66L is shown in FIG. 6 and not in FIG. 5). When the present apparatus is assembled, the housing 52R will partially surround the base portion 64R and the V member 60R will be captured between the strap 66R and oppositely inclined surfaces 68R and 70R. In similar fashion, the V member 60L would be captured between the strap 66L (FIG. 6) and oppositely inclined surfaces 68L and 70L. The wheel support 62 can therefore move vertically and horizontally relative to the carriage 46 over a range determined by the capture of the V members 60R and 60L.

A double acting hydraulic cylinder side shifter 72 is pivotably mounted between the carriage 46 and the wheel support 62 such that the side shifter 72 may be used to move the wheel support 62 sideways (i.e., perpendicular to the lengthwise direction of the vehicle) relative to the carriage 46.

OPERATION

Figure 4:
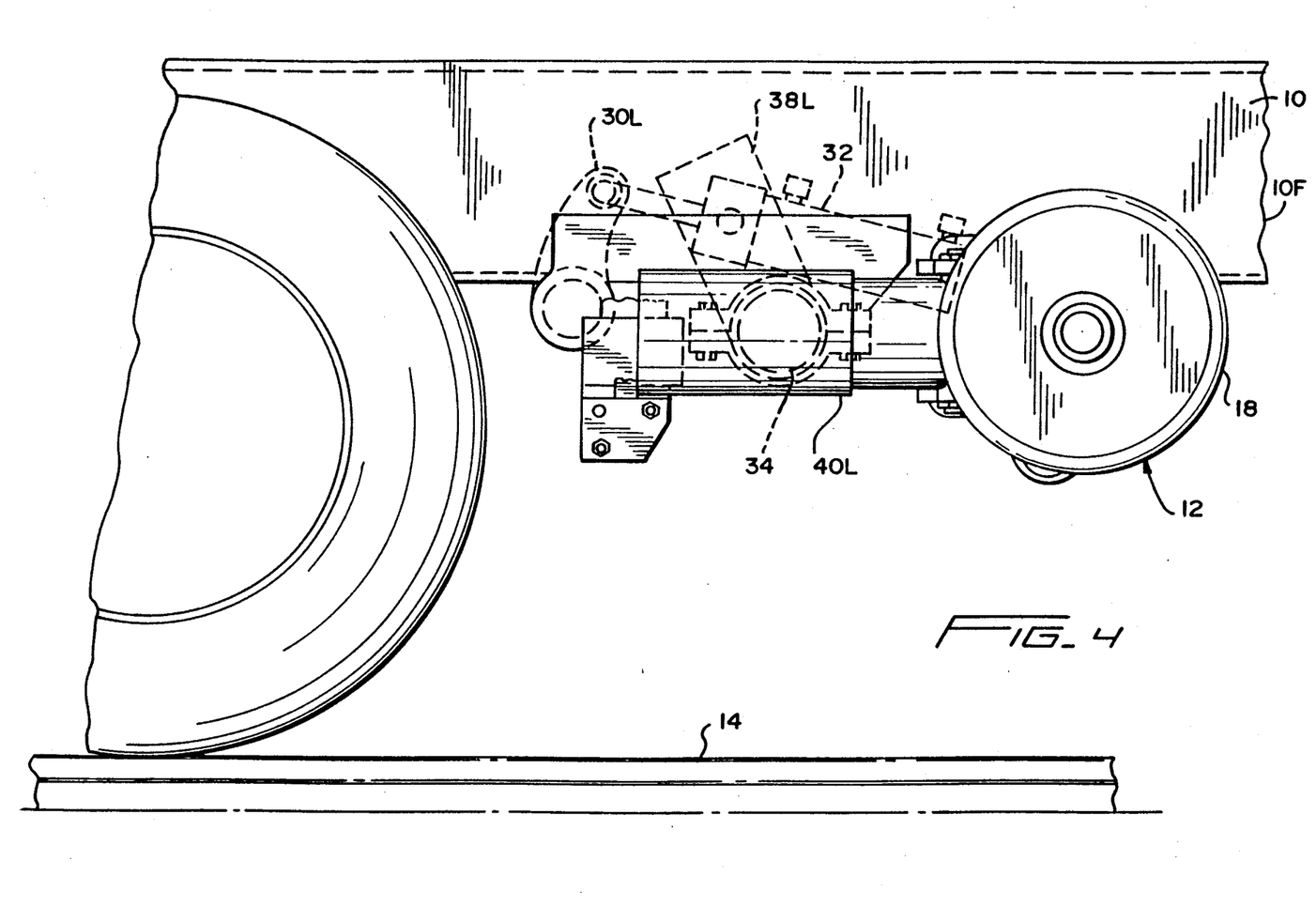
FIG. 4 shows a side view of the apparatus with the railway wheels in an upper position.

The operation of the invention will be discussed initially with reference to FIG. 4 wherein the rail wheels 18 are in an upper position. The vehicle 10 may travel along a road until it reaches a place where the driver wishes to travel along rails 14. The driver would center the vehicle 10 over the rails 14. The preferred design of the present apparatus 12 can accommodate about three inches offset in either direction from the central position over the rails. The mode actuator hydraulic cylinder 32 is extended from its retracted position in FIG. 4. This moves the plates 38L and 38R in a clockwise direction (from the direction of view of FIG. 4) and in turn rotates the cylindrical member 34 in a clockwise direction. Since the spring cells 40L and 40R are secured to the cylindrical member 34, they rotate downward from the position of FIG. 4. This in turn brings the railway wheels 18 closer to the ground.

Depending upon the confidence of the operator, he may use the side shift cylinder 72 before beginning the lowering of the wheels 18. However, if the operator is less confident of his ability to line up the wheels with the rails without the wheels 18 being lowered from their position of FIG. 4, the operator may lower the wheels 18 part way and then operate the side shift cylinder 72 to move the wheel support 62 (best understood by reference to FIGS. 5 and 6) until the wheels 18 appear lined up with the rails 14. The wheel support 62 is maintained horizontal while it is shifted sideways. The operator may actuate the side shift cylinder 72 using various known and common hydraulic controls and fluid from a hydraulic motor and, as with the controls for mode actuator cylinder 32, these controls, hydraulic circuits, and source of pressurized hydraulic fluid need not be discussed in detail. While the side shift cylinder 72 is operating, the wheel support 62 may move over a range determined by the interaction between the V members 60L and 60R and the corresponding base portions 64L and 64R.

Once the operator has side shifted the wheel support 62 to the appropriate position, the mode actuator cylinder 32 may be extended to further lower the wheels 18. The wheel support 62 will be held to the carriage 46 by virtue of the straps 68L and 68R respectively contacting the tops of V members 60L and 60R. When the wheels 18 contact the rails 14, further lowering of the carriage 46 simply separates the V members 60L and 60R from the corresponding straps 68L and 68R. Assuming that the side shift cylinder 72 had been actuated as would be necessary except in the quite unlikely event that the driver had perfectly lined up his vehicle with the rails, V members 60L and 60R will be sideways offset from the middle of base portion V blocks 64L and 64R respectively. The continued operation of the cylinder 32 will continue lowering the carriage 46 after the wheels 18 have contacted the rails. As the V members such as V member 60R are lowered, they will automatically center the vehicle relative to the rails. Specifically with reference to FIG. 7, the V member 60R will be lowered from just below the strap 66R until one of its mating surfaces 74R and 76R contacts one of the base surfaces 68R and 70R. In the position of FIG. 7, the V member 60R is offset to the right corresponding to the vehicle 10 being offset to the right. As the carriage 46 and V member 60R are forced lower, sliding contact between surface 74R and surface 68R will force the carriage 46 leftward. Referring back to FIG. 2, this leftward force will be carried to the mount frame 22 and will force the mount frame 22 leftward, this in turn tending to move the vehicle frame 10F leftward. Either the vehicle frame and vehicle will be moved leftward to center the vehicle relative to the rails 14 or, depending on the weight of the vehicle and other factors, this will place a leftward force on the vehicle which will cause it to center as soon as it begins moving forward or backward. Although FIG. 7 only shows the V member 60R, it will be readily appreciated that the V member 60L will be automatically centering the vehicle in the same fashion as with the operation of member 60R.

It should be noted that after the side shift cylinder 72 was activated and the side shifting was completed, cylinder 72 would be disposed in a float mode such that it does not constrain relative sideways movement of the wheel support 62 and the carriage 46. The hydraulic cylinder 32 would continue extending until the position of FIG. 3 is reached and the V members 60R and 60L are seated as shown in FIG. 6. Note that the spring cells 40L and 40R would be designed to take about ⅓ to ½ of the rear axle vehicle weight in that position in the preferred design.

Turning now to FIG. 6 and FIG. 8 together, a locking mechanism 80 used with the present invention will be briefly discussed. Since the locking mechanism 80 is of a general type which has been used for years, it need not be discussed in great detail. Indeed, one or more of other types of locking mechanisms could be used in order to lock the present apparatus 12 in a road mode wherein the wheels 18 are in their upper position (refer briefly to FIG. 4) and/or to lock the apparatus 12 in the rail mode with the wheels 18 in their lower position (refer briefly to FIG. 2). The apparatus 80 uses a cam plate 82 which is mounted to rotate with the cylindrical member 34. By using the cam plate 82 to lock the cylindrical member 34 in alternate rotary positions corresponding to the road mode and the rail mode, one may lock the apparatus 12 in its alternate positions. As shown in FIG. 8, the cam 82 may include first and second stops 82F and 82S, which stops may have adjustment screws thereon for fine-tuning the range of movement of cylindrical member 34. The stops 82F and 82S limit the range of movement of cylindrical member 34 by contact with part of plate 84L which is fixed to the brace 28. A dog 88 is spring-biased (spring not shown) to seat within a notch 90 in the cam plate 82. When one wants to change the mode of the apparatus 12, a handle 92 is operated to move rod 94 (see FIG. 6) so as to cause the dog 88 to pivot counterclockwise about its pivot point 88P in plate 84L. The dog 88 will move out of the notch 90 and, after a small counterclockwise (relative to the view of FIG. 8) movement of member 34 caused by the operator activating the cylinder 32, the person may release the handle 92 and the dog 88 will travel along surface 96 as the cam plate 82 continues to rotate counterclockwise. The dog will drop into notch 98 when the cam plate 82 has rotated the full extent of its movement. The cylindrical member 34 and the various mechanisms mounted directly or indirectly to move with it such as carriage 46 and wheel support 62 will then be locked in position. When one wishes to change the mode of the apparatus 12 again, manipulation of the handle 92 may be used to free dog 88 from notch 98 such that the cam plate 82 may rotate clockwise relative to the view of FIG. 8 until the dog 88 again seats in notch 90. If desired, various other locking mechanisms may be used to secure the apparatus 12 in its alternate modes.

Although various specific details have been described in the present application, it is to be understood that these are for illustrative purposes only. Various modifications and adaptations will be apparent to those of skill in the art. For example, a pair (not shown) of wheels 18 could be mounted at each end of wheel support 62 for use with heavier vehicles. A single V member such as 60R might be used for centering with a single base portion or V block such as 64R. The centering could alternately be accomplished by a pair of mating inclined surfaces at one end and a pair of mating inclined surfaces at the other end, each pair slanted in an opposite direction. Alternately, the centering means might be a hydraulic circuit to automatically return cylinder 72 to a center position once the wheels 18 are engaged to rails. Accordingly, the scope of the present invention should be determined by reference to the claims appended hereto.

What is claimed is:

1. A railway guide wheel apparatus for a road vehicle having road wheels comprising:
   a mount frame adapted to be mounted to the road vehicle; a wheel support having first and second railway wheels mounted at opposite ends thereof, said wheel support supported by said mount frame to allow relative movement therebetween;
   a mode actuator supported by said mount frame and operable to move said wheel support between;
   I. a lower position in which said first and second railway wheels engage rails; and
   II. an upper position wherein said first and second railway wheels are sufficiently raised for allowing the road vehicle to travel on a road;
   a side shifter connected to said wheel support for shifting said wheel support sideways such that said first and second wheels are lined up with rails; and centering means for automatically centering the vehicle relative to said wheel support by moving said mount frame sideways relative to said shell support; and
   wherein said side shifter is operable in a float mode when said centering means is automatically centering.

2. The railway guide wheel apparatus of claim 1 further comprising a carriage movably mounted to said mount frame, and wherein said wheel support is connected to said carriage, said mode actuator moves said wheel support between its lower and upper positions by moving said carriage between corresponding lower and upper positions, said wheel support mounted for vertical movement relative to said carriage and said centering means automatically centers the vehicle relative to said wheel support as said carriage moves down relative to said wheel support.

3. The railway guide wheel apparatus of claim 1 wherein said wheel support includes an axle and said side shifter shifts the axle sideways while maintaining the axle horizontal.

4. The railway guide wheel apparatus of claim 1 wherein said mount frame is adapted to mount on a vehicle adjacent a rear of the vehicle.

5. The railway guide wheel apparatus of claim 1 wherein said side shifter is a single actuator adapted to move said wheel support and said first and second railway wheels sideways without moving them vertically.

6. A railway guide wheel apparatus for a road vehicle having road wheels comprising:
  a mount frame adapted to be mounted to the road vehicle; a wheel support having first and second railway wheels mounted at opposite ends thereof, said wheel support supported by said mount frame to allow relative movement therebetween;
  a mode actuator supported by said mount frame and operable to move said wheel support between:
    I. a lower position in which said first and second railway wheels engage rails; and
    II. an upper position wherein said first and second railway wheels are sufficiently raised for allowing the road vehicle to travel on a road;
  a side shifter connected to said wheel support for shifting said wheel support sideways such that said first and second wheels are lined up with rails; and
  centering means for automatically centering the vehicle relative to said wheel support by moving said mount frame sideways relative to said wheel support; and
wherein said wheel support includes a first base portion and said centering means includes a first base surface on said first base portion and a first mating surface supported by said mount frame, said first base surface and said first mating surface both being inclined such that they slidably engage each other to move said mount frame sideways relative to said wheel support as said mode actuator increases a portion of vehicle weight applied to the first and second railway wheels.

7. A railway guide wheel apparatus for a road vehicle having road wheels comprising:
  a mount frame adapted to be mounted to the road vehicle;
  a wheel support having first and second railway wheels mounted at opposite ends thereof, said wheel support supported by said mount frame to allow relative movement therebetween;
  a mode actuator supported by said mount frame and operable to move said wheel support between;
    I. a lower position in which said first and second railway wheels engage rails; and
    II. an upper position wherein said first and second railway wheels are sufficiently raised for allowing the road vehicle to travel on a road;
  a side shifter connected to said wheel support for shifting said wheel support sideways such that said first and second wheels are lined up with rails; and
  centering means for automatically centering the vehicle relative to said wheel support by moving said mount frame sideways relative to said wheel support; and
further comprising a carriage movably mounted to said mount frame, and wherein said wheel support is connected to said carriage, said mode actuator moves said wheel support between its lower and upper positions by moving said carriage between corresponding lower and upper positions, said wheel support mounted for vertical movement relative to said carriage, and said centering means automatically centers the vehicle relative to said wheel support as said carriage moves down relative to said wheel support and wherein said wheel support includes a first base portion and said centering means includes a first base surface on said first base portion and a first mating surface on said carriage, said first base surface and said first mating surface both being inclined such that they slidably engage each other to move said mount frame sideways relative to said wheel support.

8. The railway guide wheel apparatus of claim 7 wherein said side shifter is a shift actuator attached to said carriage and to said wheel support to cause relative movement therebetween.

9. The railway guide wheel apparatus of claim 7 wherein said wheel support includes a second base portion and said centering means includes a second base surface on said second base portion and a second mating surface on said carriage, said second base surface and said second mating surface both being inclined such that they slidably engage each other to move said mount frame sideways relative to said wheel support, said second base surface being inclined in a direction opposite to the incline of said first base surface.

10. The railway guide wheel apparatus of claim 9 wherein said first and second base surfaces are disposed adjacent to each other.

11. The railway guide wheel apparatus of claim 9 wherein said first and second base surfaces are disposed adjacent opposite ends of said wheel support.

12. The railway guide wheel apparatus of claim 11 wherein said centering means includes an inclined third base surface on said first base portion, an inclined fourth base surface on said second base portion, an inclined third mating surface on said carriage and an inclined fourth mating surface on said carriage, and said third base surface and fourth base surface slidably engage said third mating surface and fourth mating surface respectively to move said mount frame sideways relative to the wheel support.

13. The railway guide wheel apparatus of claim 12 further comprising suspension means connected to said mount frame and said carriage, and wherein said wheel support is supported by said suspension means.

14. The railway guide wheel apparatus of claim 13 wherein said suspension means comprise two spring cells connected to opposite ends of said carriage and connected to said mount frame.

15. The railway guide wheel apparatus of claim 12 further comprising a cylindrical member mounted to said mount frame, said mode actuator connected to rotate said cylindrical member which in turn moves said wheel support.

16. A railway guide wheel apparatus for a road vehicle having road wheels comprising:
  a mount frame adapted to be mounted to the road vehicle; a wheel support having first and second railway wheels mounted at opposite ends thereof, said wheel support supported by said mount frame to allow relative movement therebetween;
  a mode actuator supported by said mount frame and operable to move said wheel support between:

I. a lower position in which said first and second railway wheels engage rails; and II. an upper position wherein said first and second railway wheels are sufficiently raised for allowing the road vehicle to travel on a road;

a side shifter connected to said wheel support for shifting said wheel support sideways such that said first and second wheels are lined up with rails; and suspension means for dampening vibrations between said first and second railway wheels and said mount frame; and wherein said wheel support is supported by said suspension means and said suspension means is supported by said mount frame, and wherein said suspension means comprise two shock absorbers connected to opposite ends of said wheel support and connected to said mount frame and further comprising a cylindrical member mounted to said mount frame, said mode actuator connected to rotate said cylindrical member which in turn moves said wheel support, and wherein each of said two shock absorbers is attached at opposite ends of said cylindrical member for rotation therewith and further comprising a carriage movably mounted to said mount frame by way of said two shock absorbers and said cylindrical member, and wherein said wheel support is supported by said mount frame by way of said carriage, said actuator moves said wheel support between its lower and upper positions by moving said carriage between corresponding lower and upper positions and said wheel support is mounted for vertical movement relative to said carriage.

17. The railway guide wheel apparatus of claim 16 wherein each of said two shock absorbers is a spring cell.

18. The railway guide wheel apparatus of claim 16 further comprising centering means for automatically centering the vehicle relative to said wheel support by moving said mount frame sideways relative to said wheel support, and wherein said wheel support includes a first base portion and said centering means includes a first base surface on said first base portion and a first mating surface on said carriage, said first base surface and said first mating surface both being inclined for sliding engagement to move said mount frame sideways relative to said wheel support.

19. A railway guide wheel apparatus for a road vehicle having road wheels comprising;

a mount frame adapted to be mounted to the road vehicle; a wheel support having first and second railway wheels mounted at opposite ends thereof, said wheel support supported by said mount frame to allow relative movement therebetween;

a mode actuator supported by said mount frame and operable to move said wheel support between:

I. a lower position in which said first and second railway wheels engage rails; and II. an upper position wherein said first and second railway wheels are sufficiently raised for allowing the road vehicle to travel on a road;

a side shifter connected to said wheel support for shifting said wheel support sideways such that said first and second wheels are lined up with rails; and suspension means for dampening vibrations between said first and second railway wheels and said mount frame; and wherein said wheel support is supported by said suspension means and said suspension means is supported by said mount frame; and further comprising centering means for automatically centering the vehicle relative to said wheel support by moving said mount frame sideways relative to said wheel support and wherein said side shifter is operable in a float mode when said centering means is automatically centering.

* * * * *

UNITED STATES PATENT AND TRADEMARK OFFICE
CERTIFICATE OF CORRECTION

PATENT NO.   :   5,186,109

DATED        :   February 16, 1993

INVENTOR(S)  :   Harry MADISON

It is certified that error appears in the above-identified patent and that said Letters Patent is hereby corrected as shown below:

Column 8, line 58 (Claim 1), change "shell" to -- wheel --.

Signed and Sealed this

Twenty-third Day of November, 1993

Attest:

BRUCE LEHMAN

Attesting Officer          Commissioner of Patents and Trademarks